US009955359B2

(12) United States Patent
Monaghan et al.

(10) Patent No.: US 9,955,359 B2
(45) Date of Patent: Apr. 24, 2018

(54) LOCATION SERVICES WITH MULTIPLE DEVICES

(71) Applicant: Cisco Technology, Inc., San Jose, CA (US)

(72) Inventors: John Monaghan, Clydebank (GB); Brett James Martin, Newbury (GB)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 14/715,652

(22) Filed: May 19, 2015

(65) Prior Publication Data
US 2016/0345163 A1  Nov. 24, 2016

(51) Int. Cl.
| | |
|---|---|
| H04M 1/66 | (2006.01) |
| H04W 16/20 | (2009.01) |
| H04W 4/02 | (2018.01) |
| H04W 84/12 | (2009.01) |
| H04W 64/00 | (2009.01) |
| H04W 4/04 | (2009.01) |

(52) U.S. Cl.
CPC ........... *H04W 16/20* (2013.01); *H04W 4/021* (2013.01); *H04W 4/025* (2013.01); *H04W 4/027* (2013.01); *H04W 4/043* (2013.01); *H04W 64/00* (2013.01); *H04W 64/006* (2013.01); *H04W 84/12* (2013.01)

(58) Field of Classification Search
CPC ..... H04W 8/186; H04W 4/021; H04W 4/025; H04W 16/20; H04W 84/12; H04W 64/00; H04W 64/006; H04W 4/027; H04W 4/043
See application file for complete search history.

(56) References Cited

U.S. PATENT DOCUMENTS

| 9,264,151 | B1* | 2/2016 | Emigh | G06Q 30/0211 |
| 2009/0118002 | A1* | 5/2009 | Lyons | G07F 17/32 463/29 |
| 2011/0084832 | A1* | 4/2011 | Midtun | G06Q 10/06 340/539.13 |
| 2013/0124315 | A1* | 5/2013 | Doughty | G06Q 30/0269 705/14.53 |
| 2013/0232010 | A1* | 9/2013 | Kritt | G06Q 30/0267 705/14.64 |

(Continued)

OTHER PUBLICATIONS

Cisco, "Cisco Connected Mobile Experiences (CMX)—CMX Analytics," Cisco At-A-Glance, 2 pages (2014).

(Continued)

*Primary Examiner* — Barry W Taylor
(74) *Attorney, Agent, or Firm* — Patterson + Sheridan, LLP

(57) ABSTRACT

A location services system used with a wireless LAN network provides wireless LAN Internet access in a venue, and also provides location-based analytics and services. The system monitors the locations of individuals using devices that communicate with a network, and maintain statistics for analytical purposes, and can provide services, such as special promotions and discounts. The system can determine whether a single person is carrying multiple devices, e.g., a user carrying a cellphone (including a smartphone) and a tablet or a laptop; and can also determine whether multiple people are within the venue as a temporary logical group, such as a family or group of friends. These capabilities allow the system to adjust how it communicates with users, and also allows it to adjust the analytics.

24 Claims, 5 Drawing Sheets

(56) References Cited

U.S. PATENT DOCUMENTS

| | | | | |
|---|---|---|---|---|
| 2013/0345965 | A1* | 12/2013 | Kirmse | G01S 5/0027 |
| | | | | 701/422 |
| 2014/0012806 | A1* | 1/2014 | Ching | G06F 17/3087 |
| | | | | 707/609 |
| 2014/0214954 | A1 | 7/2014 | Mallet et al. | |
| 2015/0249905 | A1* | 9/2015 | Haro | H04W 4/025 |
| | | | | 455/456.1 |
| 2015/0249925 | A1* | 9/2015 | Haro | H04W 4/028 |
| | | | | 455/410 |
| 2015/0324812 | A1* | 11/2015 | Wang | H04W 4/023 |
| | | | | 455/456.1 |

OTHER PUBLICATIONS

Cisco, "Cisco Connected Mobile Experiences for Retail," Cisco At-A-Glance, 2 pages (2013).

Cisco, "Cisco Hyperlocation Solution," Cisco At-A-Glance, 2 pages (2015).

Cisco, "Connected Mobile Experiences (CMX) for Healthcare," Cisco At-A-Glance, 1 page (2014).

Cisco, "Connected Mobile Experiences for Hospitality," Cisco At-A-Glance, 1 page (2014).

Hallock, B. et al., "Chapter 3: CMX Solution Components," Cisco Connected Mobile Experiences (CMX) CVD, 18 pages (Sep. 4, 2014).

Hallock, B. et al., "Cisco Connected Mobile Experiences (CMX) CVD," Cisco Validated Design, 292 pages (2014).

Little, J. and O'Brien, B., "A Technical Review of Cisco's Wi-Fi-Based Location Analytics," Cisco, White Paper, pp. 1-9 (2013).

\* cited by examiner

| Group (202) | Device (204) | Confidence Score (out of 10) (206) |
|---|---|---|
| 1 | A | 8 |
| 1 | B | 9 |
| 1 | C | 7 |
| 2 | A | 5 |
| 2 | D | 8 |
| 2 | E | 7 |
| 3 | F | 1 |

FIG. 2

LOCATION SERVICES WITH MULTIPLE DEVICES

TECHNICAL FIELD

The present disclosure relates generally to wireless LAN networks and, more particularly, a location services system used with a wireless LAN network.

BACKGROUND

The increasing use of mobile devices is making wireless local area networks (LAN) (especially Wi-Fi technology) the preferred method of network access to the Internet, including access from within venues such as buildings and campuses. Venues that have this WLAN technology can include retail stores, hotels, conference facilities, shopping malls, schools, and city centers. The entity providing Wi-Fi connectivity can monitor the location of users, e.g., for analysis and marketing purposes. Location analytics can be used to estimate a number of visitors, determine the amount of time users spend in the venue and where within the venue, and the frequency of their visits within the site. This information can be used to provide information about movement patterns while they are in the venue. The results related to the devices located over time can improve operational efficiency and security, e.g., by helping to indicate where signage should be placed, or helping to respond in an emergency. These services can also provide marketing and retail functions, e.g., by allowing promotions or discounts to be offered to users when they are in the venue, e.g., a coupon to a restaurant within a shopping mall or an airport.

BRIEF DESCRIPTION OF DRAWINGS

FIG. 2 illustrates an exemplary table that stores confidence scores associated between multiple groups and devices.

DESCRIPTION OF EXAMPLE EMBODIMENTS

The present disclosure relates to systems and methods in which a wireless network detects a plurality of mobile devices communicating with the network with wireless LAN signals, and maintains information relating to the plurality of devices including identification information and movements of the devices within an area. The system can determine whether a plurality of devices are associated with a same person based on the movement information of the devices, and/or whether a plurality of devices are with individuals that form a logical group based on the movement information of the devices. The systems and methods can be used to determine how to communicate with the users, and/or to provide analysis of the users and their use of devices.

This disclosure relates to systems and methods for providing location services. Systems and methods are described here in the context of a Connected Mobile Experiences (CMX) system by Cisco Systems, Inc., but other location service systems could be used.

Figure 1:
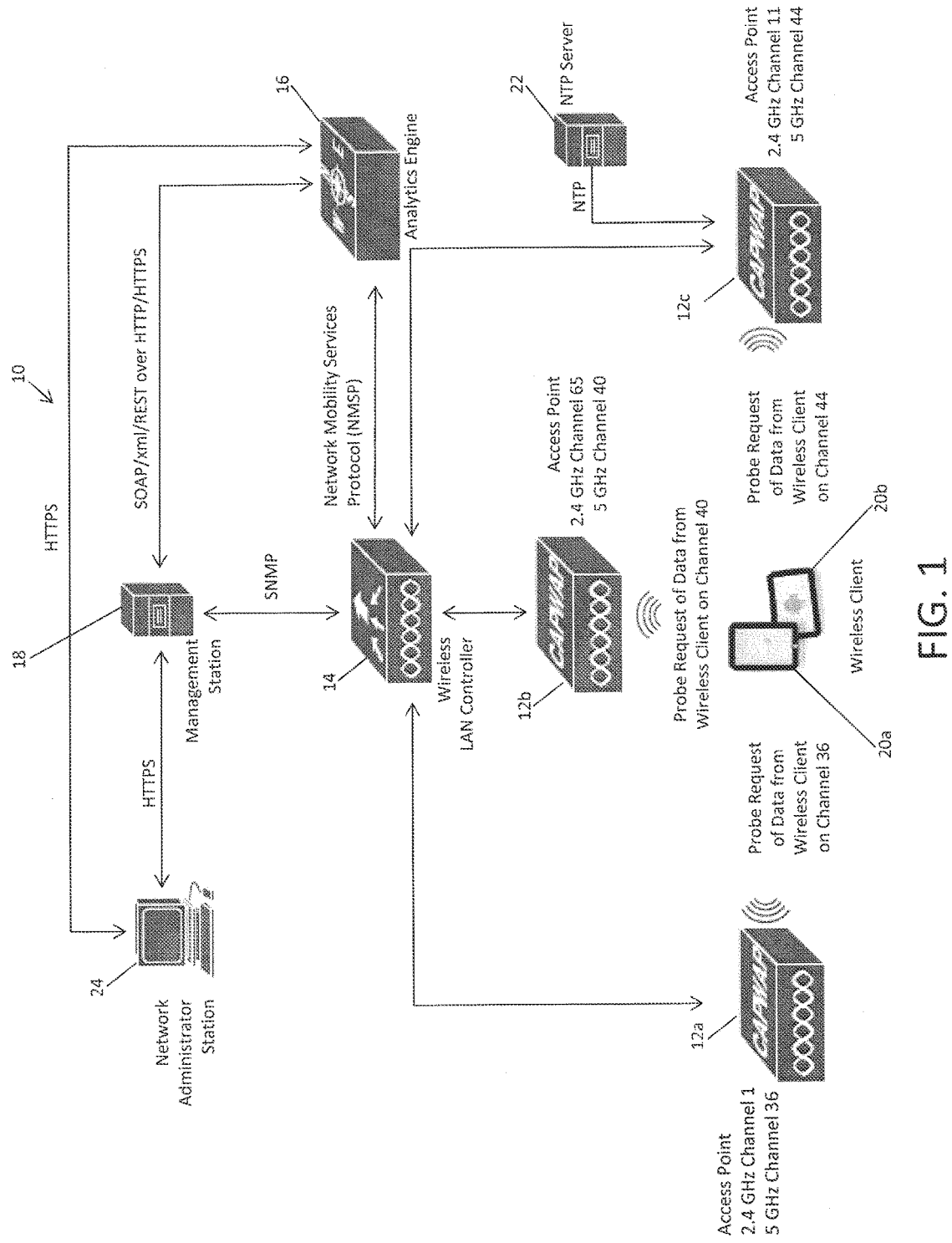
FIG. 1 is a block diagram of a location services system.

Referring to FIG. 1, the infrastructure of a system 10 for interaction with mobile devices 20a, 20b can include access points (APs) 12a-12c, one or more wireless LAN controllers (WLCs) 14, an analytics engine 16, a management station 18, and a network administrator station 24.

Wireless location services can be provided to users through analytics engine 16. The analytics engine 16 is a platform that helps the venue deliver mobile services and improve business processes, e.g., through increased visibility into the network and customized location-based mobile. In particular, the analytics engine 16 provides a service that calculates the location and/or direction of movement of WiFi devices and exposes it via an API for other applications to use and analyze. The analytics engine 16 provides a memory (i.e., a location database) that is leveraged by the applications and services. Access points 12a-12c provide Wi-Fi connectivity between mobile devices 20 and the network infrastructure. APs 12a-12c also assist in providing location services for mobile devices 20, and network connectivity for guest mobile devices. The APs shown are dual band (5 GHz and 2.4 GHz) with capability of 802.11n and 802.ac protocols, but other bands and protocols could be used.

Wireless LAN controller (WLC) 14 automates wireless configuration and management functions and provides visibility and control of the WLAN. WLC 14 can also assist in providing location services for mobile devices, and network connectivity for guest mobile devices. The WLC functionality can be within standalone appliances, integrated within switch products, or run virtually on a unified computing system. The WLC can be used with mid-sized and large single-site enterprises, and deployed within a campus supporting APs operating in centralized (local) mode. Alternatively, the WLC can be used for enterprise branch environments, deployed as a remote controller supporting APs, and hosted in a remote data center (e.g., as part of a cloud managed WLAN).

The management station 18 is a control system that can interact with wired and wireless infrastructure components to be a central management and monitoring portal. The management station configures and monitors switches and routers, and also controls, configures, and monitors all wireless LAN controllers (WLCs) and, by extension, all access points (APs) on the network. The management station can also provide an administrative interface to a network administrator 24 for importing and tuning floor maps of the venue for location services, integrates with analytics engine 16 to synchronize floor maps, synchronizes the analytics engine, services with WLC 14, integrates with analytics to import APs not associated with any floor map, and provides an administrative interface for enabling analytics engine services. Multiple wireless LAN controllers and mobile service engines may be managed and monitored by the management station.

FIG. 1 also provides a high-level overview of the information flows between the various hardware components. It assumes the WLAN within the site has been designed for location services.

To collect Wi-Fi location information for a site, a network administrator 24 can set up a wireless infrastructure to support location services. This setting up of the wireless infrastructure can include importing a floor map for a venue into the management station 18, sizing and tuning the floor map, placing APs 12a-12c in the correct location on the floor map, enabling the analytics engine 16, and syncing the WLC 14 and analytics engine 16 through the management station 18. Network administrator 24 can accomplish this by establishing an HTTPS session to the management station server and using a graphical user interface (GUI). Floor maps are not essential for determining the location of devices in the venue, but can add to the value of the disclosed system by allowing for context-aware location-based services. For example, if floor maps are used, the disclosed system can determine when a certain user is close to the food court of a mall, and can provide food-related promotional content to the user.

The network administrator can also synchronize the floor map information with analytics engine 16. The interface between management station 18 and analytics engine 16 can use SOAP/XML and REST messages over HTTPS. Network administrator 24 also synchronizes analytics engine services with the WLC 14 so that WLC 14 forwards collected data (location, intrusion detection, etc.) from the APs 12a-12c to analytics engine 16. Additional configuration of the analytics engine 16 and its associated analytics functions can be done by directly establishing an HTTPS session to analytics engine 16 running the associated service.

Depending on the location method, APs can be time synchronized via an NTP server 22 so that wireless security modules (WSMs) (not shown) can simultaneously scan the same channel as they proceed through the scan list. One method uses probe requests, and another uses all packets for detection. To aid the analytics engine 16 in pinpointing each wireless device's location, wireless devices 20 can send probe requests on each active channel, or they can associate with an AP and send packets if using a different location feature. Each AP within range of the wireless client either hears the probe requests sent by wireless devices 20, or hears packets when the monitoring radio within the WSM module dwells on the channel on which the wireless client is operating on. Receive signal strength indication (RSSI) information is calculated for the particular wireless device from either the probe requests or from packets sent by the wireless devices.

Three or more APs are used to determine the X,Y coordinates of the wireless mobile device relative to the shared floor map, although further accuracy is obtained when a wireless device is seen by at least four APs. APs 12a-12c can be configured onto the floor map synchronized with analytics engine 16. If an access point has not been placed on the floor map, RSSI information can still calculated by the access point and forwarded to analytics engine 16. However, analytics engine 16 does not have to use the RSSI information from the particular AP in determining the X,Y coordinates of the wireless device. If the RSSI values calculated by all of the APs and sent to the analytics engine are below the RSSI cutoff threshold setting within the analytics engine, the analytics engine can optionally ignore the calculation and the data point is not stored in the analytics engine location database.

WLC 14 can aggregate RSSI information for each wireless device 20a, 20b from each AP 12a-12c which it controls and forwards messages to analytics engine 16 (or multiple analytics engines), e.g., every two seconds, using the Network Mobility Services Protocol (NMSP).

Since RSSI information regarding a given wireless client could come from APs on the same floor map, but controlled by different WLCs, the location services engine within analytics engine 16 aggregates data for some time, e.g., five seconds before calculating locations of wireless devices. Once the location calculation is completed, analytics engine 16 can update the location database for the particular wireless device. An analytics engine within the analytics engine can use the updated information within the location database.

Probe requests are sent when the wireless device actively scans for a basic service set (BSS), i.e., an AP with which to join. Probe requests are used to collect RSSI information because the wireless device typically probes multiple channels to develop a scan report which is then used by the client to select which BSS/AP to join. Wireless devices typically cycle through 5 GHz and 2.4 GHz channels as they send probe requests, waiting for probe responses. The wireless device typically sends a probe request on a particular channel and briefly listens for a probe response before switching channels and sending another probe request.

In FIG. 1, three APs 12a, 12b, and 12c operating in both the 2.4 GHz and 5 GHz frequency bands are shown. As a wireless clients (e.g., device 20a) generates probe requests on channels 36, 40, and 44 in the 5 GHz frequency band, each of the APs hears, respectively, the probe request.

Alternatively, RSSI information is collected on all data packets transmitted by the wireless client, not just probe requests. This feature can make the collection of RSSI data more deterministic and more current, and therefore reduce location error. APs can be capable of listening to both Probe and data packets which they forward along with RSSI information and MAC addresses to the WLC 14. With this feature, channel scanning is synchronized across APs using Network Time Protocol (NTP). The result is that all APs within the site can listen to the same 5 GHz or 2.4 GHz channel at the same time. The frequency by which each channel is monitored (the return time to channel) influences the currency of location information (the location refresh rate) obtained by this location feature. The frequency by which each channel is monitored is based upon the number of channels within the scan list and the dwell time (Tdwell) on each channel. An off-channel scan list is the list of channels to be monitored for activity. The dwell time is the amount of time the WSM radio monitors that particular channel along with the time required to change channels.

FIG. 1 depicts an illustrative embodiment only, and different embodiments are also possible. For example, certain components, including the management station 18, the WLC 14, the analytics engine 16, the NTP 22, and any of the APs 12a, 12b, and 12c can be removed. Components can be integrated such that a single device implements the functionality of what is now depicted as multiple devices (e.g., analytics engine 16, WLC 14, and/or management station 18 can be combined). Additionally, components can be distributed, such that the functions of what is now depicted as one device can be performed by multiple devices (e.g., analytics engine 16 can be broken up into multiple devices). While FIG. 1 currently depicts certain information flows as bi-directional, other embodiments can employ communications links that allow data to flow in one direction only.

As a further example, WiFi APs 12a, 12b and 12c in FIG. 1 can be replaced or augmented by Bluetooth sensors (not shown). These Bluetooth sensors can be distributed throughout the venue and can transmit data to mobile apps installed in users' devices. The mobile apps installed in the users' devices can then report the detection of these Bluetooth sensors to Analytics Engine 16 via a WiFi connection, a Bluetooth connection, or some other wireless radio communication technology or protocol. In some embodiments, the mobile apps can also report RSSI information associated with each Bluetooth sensors' detection to Analytics Engine 16. By correlating the Bluetooth sensors that a user's device had detected with an internal map of Bluetooth sensors' locations, the Analytics Engine 16 can pinpoint the location of the user's device. In yet another embodiment, the Bluetooth sensors distributed throughout the venue can directly sense the presence of user's devices by keeping track of devices with unique Bluetooth IDs that come within range of the Bluetooth sensors. The Bluetooth sensors can then transmit the detected device with the unique Bluetooth ID to the Analytics Engine 16, which can also use this information to determine the device's location. In this embodiment, no reporting by the user's device is necessary beyond a routine transmission of its Bluetooth ID, which is part of the normal Bluetooth session establishment protocol. In addition to Bluetooth-based sensors, use of other wireless radio communication technologies to detect devices' positions are also possible.

The system provides multiple levels of functionality. Detection functionality detects the presence and/or location of a mobile device within a venue. This mobile device could belong to a customer within a retail establishment, a patient within a healthcare facility, a patron to a museum, a traveler within an airport, an employee within a corporate location, etc. Insight into movement, dwell times, and crowding within the venue can then be acquired to provide improved service.

Connection functionality provides a convenient and scalable method of connecting a mobile device to a guest wireless LAN network within a venue. This can be used to provide context-based services to visitors while at the venue or potentially for gaining insight into the demographics of visitors to the venue via social media sites.

Engagement functionality provides context-based services to the visitor through their mobile device as they enter and move through various points-of-interest (POIs) in the venue (e.g., a coupon to a user for use within the venue).

Location analytics make use of the location information collected by the analytics engine to determine mobile device parameters such as dwell time (how long people stay in a specific point), crowding (popular points at which people stay a long time), and path choice (e.g., do people usually turn left or right when coming out of an elevator). The location analytics aggregate this information to allow entities to better understand how customers interact with different parts of their venues or environments. Businesses can utilize location analytics to help achieve better facility planning, measure changes in their buildings, and improve interactions with customers.

The basic data items used by the location analytics is in the form of media access control (MAC) addresses that identify the device, time, X and Y coordinates, etc. The location analytics help aggregate and visualize this data, e.g., with anonymous media access control (MAC) addresses, to help generate insights about the movement and behavior patterns of the people using mobile devices who are visiting a venue.

It would be useful to identify multiple devices and the relationship between them. A single user might use multiple mobile devices, especially in locations such as an airport. The devices could be, for example, a combination of smartphone, tablet, laptop, and eReader. Increasingly users carry these devices with them, thereby presenting opportunities for vendors to interact with customers. Further wearable devices such as smart watches, wrist bands, smart badges, and sensors can also be used.

There are also situations in which multiple devices can be used to form part of a related set, or mobile "group." This group could be a family, a group of friends, a school party, a guided tour, etc. It would be useful for vendors or venue owners to identify such groups for potential marketing opportunities, such as offers or promotions to the whole group, as well as analysis of group related behavior, such as traffic movement.

The systems and methods described here relate to identifying and interacting with multiple devices to determine if they are within a single user or part of a multi-person mobile group. The mobile group can be a logical collection of related mobile devices with a Wi-Fi or other radio communications capability. The systems and methods can detect when mobile groups are created, removed, or appear within the vicinity of a wireless network. This can be achieved by combining wireless location detection with both proximity and movement patterns.

A benefit of such a system is in the visualization of mobile analytics. Currently, devices belonging to a single individual would typically be plotted on a graph as a set of disconnected icons (dots). This can complicate and obscure more meaningful data. It would be more beneficial if those devices could be correlated to a single image on the analytics and mapping screens. Alternatively, it would also be beneficial if those devices could be represented as separate icons, but with the relationship between them indicated by some visual indicator (e.g., via a common color, common icon, a displayed common group number, etc.)

For example, such a system can output an analysis of movement of devices within a venue. Such an analysis can take the form of, for example, a dynamically updated map of the venue in which colored icons represent the most recent locations of devices. The analysis can also take the form of a graph or chart (e.g., a line graph, a histogram, or other type of graphic for presenting data) showing foot traffic through various zones on the venue. By identifying situations where multiple devices belong to a single individual, multiple icons or points of data on the map or graph can be combined into a single icon or point of data to simplify the analysis, and to avoid double-counting foot traffic in the venue. Similarly, by identifying situations where multiple devices belong to individuals in a mobile social group (e.g., a family, a group of friends, a school party, a guided tour, etc.), the analysis can display icons or points of data in such a way as to make clear which devices are in the same group. For example, devices belonging to the same group can be bounded by a colored box, or be colored with a distinctive color. In some embodiments, the analysis can also display and/or take into account different device types (e.g., cellphone, tablet, laptop, smartwatch, etc.). The analysis can show only devices of a certain device type, identify different device types using different icons, colors, or other distinguishing characteristics, or count the prevalence or relative prevalence of different types of devices.

The systems and methods described can be implemented at a venue. A venue can be a physical area and can include multiple zones. Zones can be areas of coverage in a venue defined by the system. Zones can be defined according to the zones of coverage of various access points. Additionally, zones can be also defined according to logical subdivisions of the venue. For example, if the venue is a mall, a different zone could be defined for each store in the mall, for the food court, for different common hallways, and/or for different locations in the parking lot. If the venue is an airport, a different zone could be defined for different gates, for the food court, for common hallways, for the customs area, the baggage handling area, and different security zones. Each zone in the venue can be associated with 0 or more service set identifiers (SSIDs).

As used herein, the term "group" can refer to a set of devices that (i) have been logically linked together as being potentially part of the same social group (e.g., group of friends, a school party, a guided tour, etc.), or (ii) have been linked together as being potentially associated with a single user (e.g., one person carrying both a phone and a tablet). In some embodiments, when devices first appear at a venue and are identified, these devices can be categorized into new "groups" comprising one device only. Over time, by analyzing events associated with these devices as described below, multiple "groups" can be combined and aggregated into larger groups. If it appears later on, based on further analysis, that certain devices in a group are actually not part of that group, the group can also be split apart. A group can be defined as a series of records including: mobile access control (MAC) addresses of its component devices, device types for each of its component devices, zone, service set identifier (SSID) of the zone in which the group is currently located, co-ordinates for the group's position (e.g., X, Y, and optionally, Z coordinates), time-stamp of the group's last detected location, and velocity (e.g., including a direction, which can expressed as a vector in two- or three-dimensions, and speed, which can be expressed as a scalar variable). Some information, such as the SSID, is optional.

The system can determine a group profile which is an average of all device records associated with the group to give an instant view of the group devices. In some embodiments, the group profile can include a data structure including the number of devices within the group, the average location of the group (which can be derived, for example, by calculating the average X and Y positions of every device to derive a "center of mass" of the group), and the average direction of travel for the group (which can be derived, for example, by averaging the X and Y movement vectors of every device in the group).

A confidence score (CS) can be associated with a device and a group, and can be a measure of the likelihood that the device belongs to the group. The confidence score can be as simple as the count of the number of events associated with that device in that group, but other CS algorithms may be inserted. The more device events that get associated with a particular group, the higher the CS and the greater the likelihood that the device belongs to that group. A tolerance can refer to an allowable deviation from the group average profile. For example, a deviation of a device of 4 m from the group average could be considered within a distance tolerance. The other tolerances can be used, e.g., time together. The tolerances can be modified and optimized.

FIG. 2 illustrates an exemplary table 200 that stores the confidence scores associated between multiple groups and devices. Table 200 includes a column for group 202, a column for devices 204, and a column for confidence scores 206. In this example, table 200 includes three groups: group 1, group 2, and group 3. Table 200 also lists six devices: device A, B, C, D, E, and F. Group 1 contains devices A, B, and C. Group 2 contains devices A, D, and E. Group 3 contains only one device, device F. The confidence scores listed in confidences core column 206 is scored out of 10, with 10 being the highest confidence and 0 being the lowest confidence—however, different scales for confidence scores can be used. Each device and group combination is associated with a confidence score. For example, the confidence score associated with group 1 and device A is 8, while the confidence score associated with group 1 and device B is 9. Table 200 can be updated every time a new set of events is detected, as described in further detail below. In some embodiments, Table 200 can be expanded to include a confidence score for every single combination of a group and a device.

Figure 3:
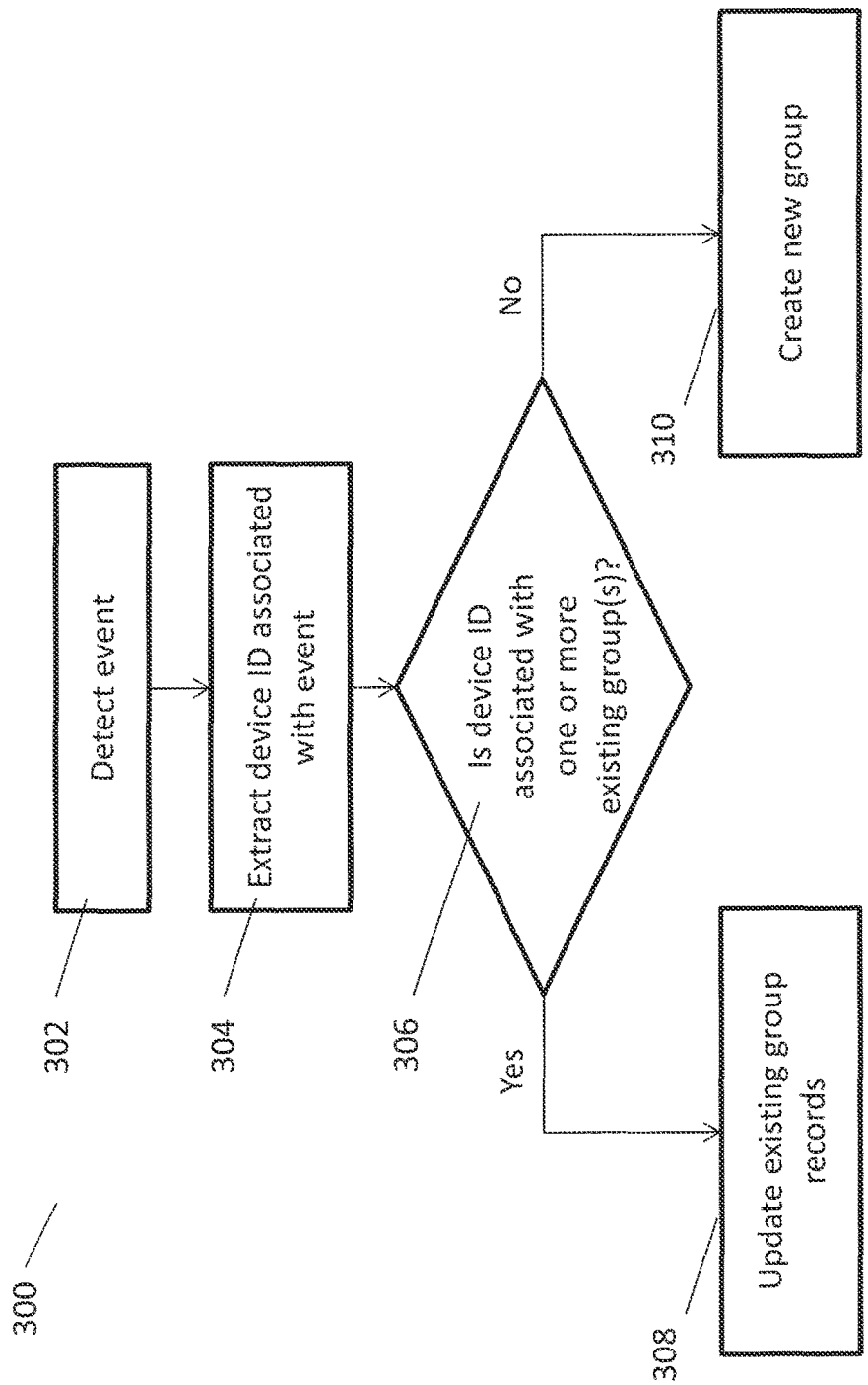
FIG. 3 illustrates a flowchart of an exemplary process that can be used to detect events associated with devices, and to sort them into groups.

FIG. 3 illustrates a flowchart of an exemplary process 300 that can be used to detect events associated with devices, and to sort them into groups. At stage 302, events can be detected by the wireless presence and location system. "Events" can be characteristics of a device and/or a device's movement that can be detected by the wireless presence and location system. The following are examples of the types of events that can be detected: periodic update of a device within a zone in the venue, periodic update of a device's position within a zone in the venue, movement of a device into/out of a zone, directional change of a device within a zone, and speed change of a device within a zone. Once an event is detected by the wireless presence and location system, the event is passed to a mobile group analyzer in analytics engine 16.

At stage 304, a device ID associated with the event is extracted from the event. The device ID can include a MAC address or some other unique ID associated with the device, and can be extracted, for example, from use address OUI, or DNS, DHCP, or HTTP Agent requests.

At stage 306, process 300 determines if the device ID is associated with one or more existing groups already on record. If the device ID is determined to be a member of an existing group, process 300 branches to stage 308, where existing group records, group profiles, and confidence scores (CS) are updated. If the device ID is determined to not be a member of an existing group (e.g., the device ID has not been seen before, or has been seen before but is not logically linked with any existing group), process 300 can branch to stage 310 where a new group can be created. In some embodiments, the new group can comprise only one device record, e.g., a record having the device ID extracted in stage 304. The following properties can be initialized for this new group: device ID records, group profile, and updated confidence scores. In some embodiments, the newly detected device can be immediately aggregated with an existing group.

Figure 4:
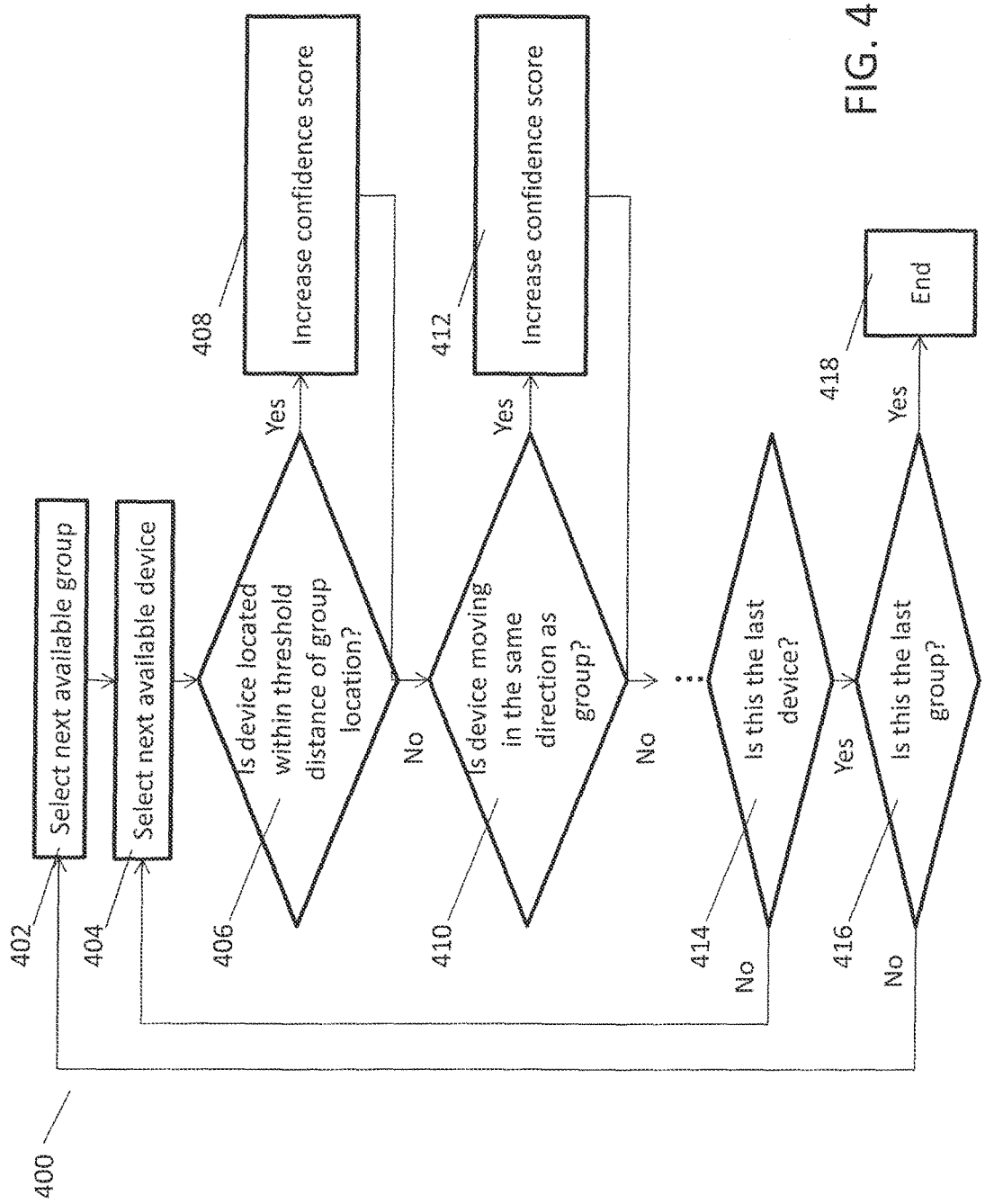
FIG. 4 illustrates a flowchart of an exemplary process for updating confidence scores associated with devices and groups.

FIG. 4 illustrates a flowchart of exemplary process 400 for updating confidence scores associated with devices and groups. Process 400 is exemplary only and can be modified by adding, deleting, re-arranging, or changing different stages.

At stage 402, process 400 can select the next available group to consider. At stage 404, process 400 can select the next available device to consider.

At stage 406, process 400 can compare the location of the selected device against the location of the selected group. The location of the selected group can be determined by averaging the positions of each of the group's constituent devices. Other methods for determining the location of the selected group can also be used. If the location of the device is within a predetermined threshold distance of the location of the group (e.g., 4 meters), process 400 can branch to stage 408, at which the confidence score associated with the selected group and the selected device can be increased. After the confidence score has been increased, stage 408 can branch to stage 410. If the location of the device is located farther from the group than the predetermined threshold, process 400 can branch to stage 410 without increasing the confidence score. In this way, the confidence score, e.g., the degree of confidence that the selected device is part of the selected group, can be increased only if the device is located sufficiently close to the location of the group.

At stage 410, process 400 can compare the direction of movement of the selected device against the direction of movement of the selected group. In some embodiments, this comparison can be computed by expressing the direction of movement of the device as a first normalized vector, and the direction of movement of the group as a second normalized vector. Process 400 can then compute the vector product of the two normalized vectors, and determine if the vector product is above a predetermined threshold. If the vector product is greater than the predetermined threshold (e.g., the two directions are well aligned), process 400 can branch to stage 412, where the confidence score is increased. If the vector product is less than the predetermined threshold (e.g., the two directions are not well aligned), process 400 can branch to the next stage, without increasing the confidence score. Other methods for comparing the direction of movement can also be used, such as determining the angle between the two movement vectors, determining the cosine of the angle between the two movement vectors, etc.

The checks and comparisons described above for stages 406 and 410 are exemplary only, and are optional. Other types of checks and comparisons not shown in FIG. 4 are also possible. For example:

Process 400 can compare the relative speed of the device vs. the speed of the group. If the device is travelling at approximately the same speed as the group, the confidence score can be increased.

Process 400 can compare the amount of time the device and the group have spent together, vs. the time spent apart. If the amount of time spent together increases, the confidence score can be increased.

Process 400 can determine whether the device and the group tend to enter and exit zones together. For example, if the venue is a mall, and each zone corresponds to a different store, one might expect members of a social group to split up and browse different parts of a store while in the store, but to enter and exit the store together as a group. If the selected device and the selected group spend time apart while within a zone, but tend to enter and leave zones at the same time, the confidence score can be increased.

The thresholds and criteria used in each of stages 406, 410, and any other checks and comparisons can also differ depending on which zone the device and the group are located in. For example, in a mall setting, one might expect a social group to split up while in a store (e.g., a first zone), but remain together while sharing a meal at the food court (e.g., a second zone). Similarly, in an airport setting, one might expect a social group to split up in a zone corresponding to a shopping area, but remain close together, potentially for an extended period, in the food court. Therefore, the predetermined distance threshold in stage 406 can be configured to vary depending on whether the device and the group are located in a first zone or set of zones, and whether the device and the group are located in a second zone or set of zones. Commonality in direction of travel can also differ depending on what zone the device and the group are located in. For example, one might expect a social group to travel in the same direction while in a common hallway at a mall, airport or train station, but to split up and travel in different directions while in a store. In some embodiments, therefore, stage 410 can be used only when the selected device and the selected group are in a zone corresponding to a hallway or access area, but not be used when the selected device and the selected group are in a zone corresponding to a store. Other thresholds and criteria for determining whether to increase the confidence score between a device and a group can also vary depending on zone.

After at least one check and/or comparison has been made between the characteristics of the device and the characteristics of the group, process 400 can branch to stage 414.

At stage 414, process 400 can determine whether the selected device is the last device. If the selected device is not the last device, process 400 can branch back to stage 404. If the selected device is the last device, process 400 can branch to stage 416.

At stage 416, process 400 can determine whether the selected group is the last group. If the selected group is not the last group, process 400 can branch back to stage 402. If the selected group is the last group, process 400 can branch to stage 418 and end.

At the end of process 400, the confidence scores of all device/group pairs can optionally be decreased. This decrease can be implemented by a decay function, wherein the significance of events that seemed to indicate a device was part of a group is given less emphasis if the event occurred farther in the past. Alternatively or additionally, the device/group pairs whose confidence scores were not increased during the last iteration of process 400 can be identified, and the confidence scores of those identified device/group pairs can be decreased. If a device ID has not been detected for some time, process 400 can also optionally delete device ID from any groups of which it is a part. If the deletion of a device from a group causes the group to have no devices remaining, the group can also optionally be deleted.

Once the confidence scores of all device/group pairs have been updated, the associations of devices with groups can be updated. In some embodiments, if the confidence score for a particular device/group pair is below a certain threshold, the device can be considered separate from the group, and the group can be updated to delete the device from its list of members. Additionally, a group can be split into multiple sub-groups if the system determines that the confidence scores of the component devices are below a certain threshold. If the confidence score for a particular device/group pair is above a certain threshold, the device can be considered part of the group, and can be added to the group's members (or, if the device is already part of the group, its position in the group can be maintained).

Groups can be further classified into two types. A first type of group can indicate that its member devices correspond to the same user (e.g., a phone, a tablet, a laptop, and a wearable smartwatch all carried and used by the same user). This determination can be useful for analytics to avoid double counting foot traffic, and also to understand how many people have multiple devices; and also useful for marketing, because the network can choose which device it should send a message to. For example, for content that would benefit from a larger screen, sending to the tablet or laptop would be useful; but to send a short message more immediately, the network could choose to send to the cellphone. The information could also be used to assist the consumer if a device were lost or stolen, because the system could determine that the user of a first device was also the user of a second device.

A second type of group can indicate that its member devices correspond to different users which belong to the same social, familial, or other logical group (e.g., a group of friends or a family, a guided tour, etc.). This determination can be useful for promotional related reasons. For example, a store or a venue could determine to offer a coupon to a single user. If, however, the store or venue determined that the single user was part of a larger social, familial, or other logical group, the same coupon could be offered to all members of that group. Additionally, a store or venue could determine to offer a coupon to a user precisely because the user is part of a group, and is not travelling or moving by him or herself. For example, a coupon for a meal for four would be not be very useful for a single user, but might be attractive to a family of four moving through a mall together. Thus, a store or venue could determine to offer this coupon to only groups of four or more, but not to smaller groups. This determination can also be useful for analyzing demographic and traffic patterns. For example, if a mall determined that most of the foot traffic in its mall came in groups of four, the mall could adjust the seats in its food court to best accommodate groups of four.

The system can be configured to differentiate between these two types of groups. In some embodiments, the system can categorize groups with confidence scores associated with a first confidence score threshold to be the first type of group (e.g., multiple devices corresponding to one common user). The system can also categorize groups with confidence scores below the first confidence score threshold to be the second type of group (e.g., multiple devices corresponding to multiple users). In some embodiments, the system can also compare confidence scores against a second threshold that is lower than the first threshold, and to categorize groups as the second type of group only if its confidence scores are lower than the first threshold but higher than the second threshold.

Additionally, the system can use other parameters and criteria to differentiate between the first type of group and the second type of group. For example, a single user will likely have a substantially identical path because one user is carrying multiple devices. However, a group of people might require different thresholds because people shopping together or walking through an airport together can take different paths to look at different merchandise, or one might speak to an employee for directions, or stop to check email while the other continues to walk. The system can therefore classify a group as a single-user group only if its component devices were always located within a strict distance threshold of the group location, and were always moving in the same direction and at the same speed. The system can classify a group as a multiple-user group if its component devices do not satisfy the strict distance, direction, and speed thresholds for single-user groups, but still share enough commonalities in location, direction and speed that the devices likely belong to users in one social group. With more relaxed tolerances for variation, the system could first determine that two devices belong to a group, and over time, update the assessment to determine that there is in fact a single user.

The system can also adapt in response to a number of false positives; for example, if there are a number of false positives that a single user is carrying multiple devices, the system can alter its algorithms to require longer periods of the devices being in close proximity.

The wireless location system and mobile group analyzer could also accommodate wireless signals and events from other radio communications, such as Bluetooth or NFC. A matching group is one in which the received event is within tolerance. For example, Device A might move to a new location outside the tolerance of a current group, but within tolerance for another group. The analyzer exposes an API to allow further integration such as with social networking systems for additional group demographics.

The system can be used with known and registered individuals, and/or with guests. A registered user could be an individual who has previously registered with the venue. For example, a consumer could register with a shopping mall or store; when the user arrives at the venue, he or she can log in to the network to obtain wireless LAN (typically Wi-Fi) connectivity, and also potentially other benefits, such as well-targeted promotions, rewards points, etc. A guest could be an individual that is obtaining guest connectivity. In either case, the system can monitor the user's movements within the venue as discussed above, for analytics purposes and for promotional purposes.

Figure 5:
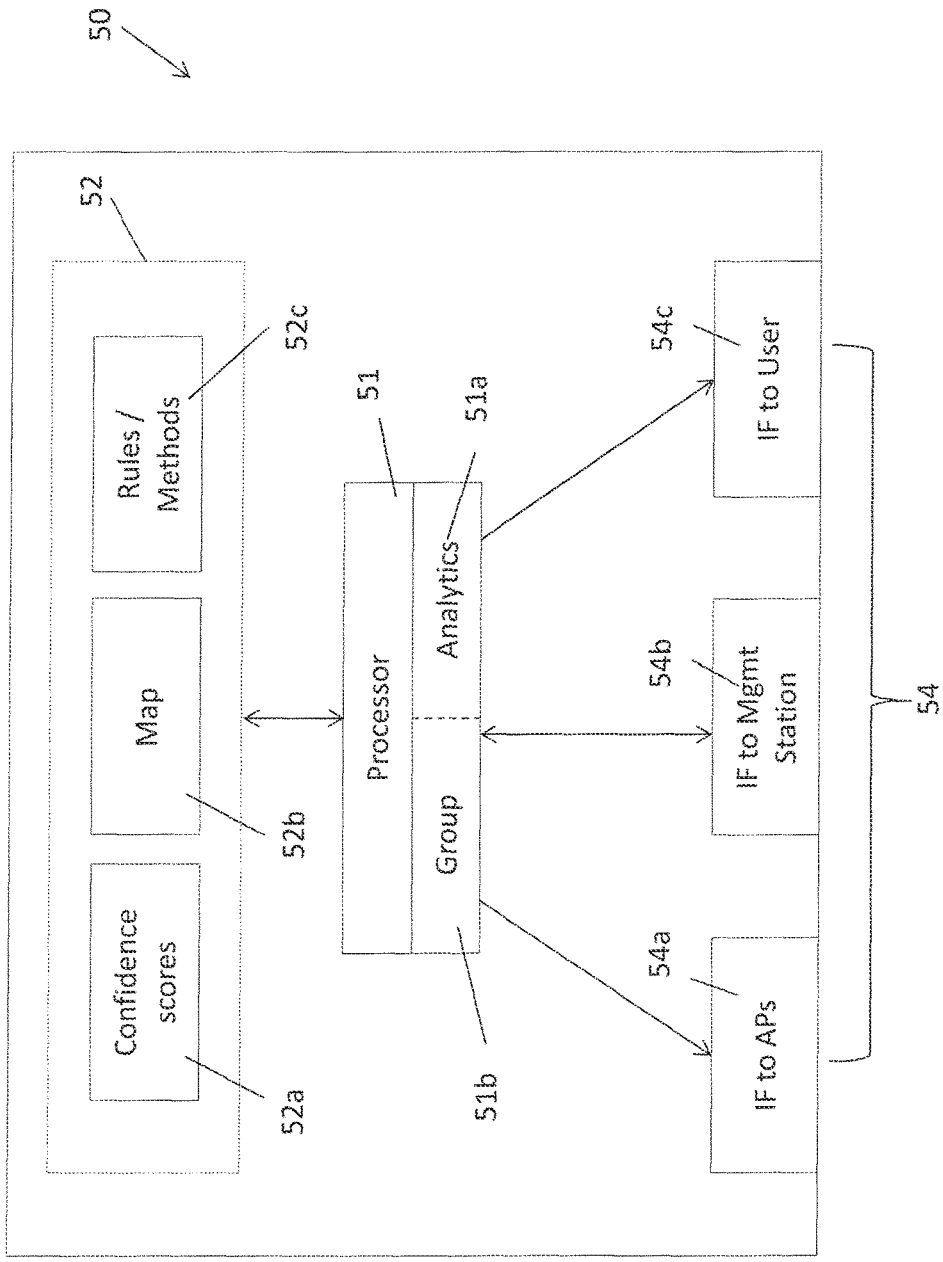
FIG. 5 illustrates the components of an exemplary device that can implement the disclosed systems and methods.

Referring to FIG. 5, the systems and methods disclosed herein can be implemented on a device 50 including a processor 51 for executing instructions, memory 52 having multiple locations for storing confidence scores 52a (e.g., table 200 described above in relation to FIG. 2), floor maps 52b, and rules/methods 52c, and interfaces 54 to other portions of the system, including external interfaces to access points via a wireless LAN controller 54a, external interfaces to the management station 54b, and external interfaces to users 54c. Interfaces 54 can comprise a single interface that can communicate with each of the aforementioned components, or multiple separate interfaces, and can be implemented as a wired connection or a wireless connection. In some embodiments, the device 50 can be implemented on an analytics engine 16. In other embodiments, the device 50 can be implemented as part of Wireless LAN Controller 14, as part of management station 18, or as a stand-alone device. In yet other embodiments, device 50 can be split into multiple components that are distributed across any of the aforementioned devices. The processor 51 can execute instructions stored in the memory 52. The processor 51 can also include a location analytics engine 51a that determines the positions of devices (e.g., the X, Y, and optionally, Z coordinates corresponding to a device's location). The processor 51 can also include a mobile group analyzer 51b that can be configured to implement the processes 300 and 400 described above in relation to FIGS. 3 and 4. While the description assumes there is a distinct analytics engine with the identified components, the memory 52 that is used could reside remotely from the processor 51, and there can be one or multiple memory devices that make up the memory. Similarly, the processor 51 can also be implemented on more than one processor. In some embodiments, for example, the mobile group analyzer 51b can be implemented on a separate processor than the location analytics engine 51a. As noted above, the device 50 can identify X and Y coordinates, and can determine the location of each device, how long people stay in a specific point, popular points at which people stay a long time, and path choice.

The disclosed systems, methods and apparatus are directed to implementing location services with multiple devices.

In one aspect, the present disclosure is directed to a method. The method can comprise detecting, by a wireless network, a plurality of mobile devices communicating with the network. The method can further comprise maintaining information relating to the plurality of devices including identification information and movement information of the devices within an area; and determining whether the plurality of devices are associated with a same person based on the movement information of the devices.

In some embodiments, the determining can include determining that a first device and a second device are associated with the same person. The method can also further comprising determining that the first device is associated with a first device type, and that the second device is associated with a second device type that is different from the first device type; and selecting whether to transmit information intended for the person to the first device or the second device depending on at least one of the first device type and the second device type.

In some embodiments, the first device type can include a cellphone, and the second device type can include at least one of a tablet and a laptop.

In some embodiments, the movement information can include a direction of movement of a device, a length of time a device is in a location, and a length of time a device is proximate to another device.

In some embodiments, the method can further comprise providing as an output an analysis of the movement of devices within a venue, wherein the analysis including identifying situations in which a single person is identified as having multiple devices.

In some embodiments, the method can further comprise including in the analysis identification of device types.

In some embodiments, the determining can be based on a comparison of an analysis of parameters to a threshold.

In another aspect, the present disclosure is directed at another method. The method can comprise detecting, by a wireless network, a plurality of different mobile devices communicating with the network. The method can further comprise maintaining information relating to the plurality of devices including identification information and movement information of the devices within an area; and determining that the plurality of devices are associated with multiple users that are members of a logical group based on an amount of time the plurality of devices are close together and based on directions of movement of the plurality of devices.

In some embodiments, the multiple users can be in a venue. The method can also further comprise sending to a member of the logical group information originating from the venue.

In some embodiments, the information originating from the venue can include a coupon.

In some embodiments, the method can further comprise providing as an output an analysis of movement of devices within a venue, wherein the analysis includes identifying situations in which logical groups of people are moving within the venue.

In some embodiments, the method can further comprise including in the analysis identification of device types.

In some embodiments, the determining can be based on a comparison of an analysis of parameters to a threshold.

In some embodiments, the method can further comprise determining a confidence score based on a determined likelihood that a user of the multiple users is a member of the logical group.

In yet another aspect, the present disclosure is directed at another method. The method can comprise detecting, by a wireless network, a plurality of mobile devices communicating with the network. The method can also comprise maintaining information relating to the plurality of devices including identification information and movement information of the devices within an area; determining whether the plurality of devices are associated with a same person based on the movement information of the devices; and determining whether the plurality of devices are associated with individuals that form a logical group based on the movement information of the devices.

In some embodiments, the determining can include determining that a first device and a second device are associated with individuals from the logical group, but are not carried by one person.

In some embodiments, the movement information can include the direction of movement of a device, the length of time a device is in a location, and the length of time a device is proximate to another device.

In some embodiments, the method can further comprise providing as an output an analysis of movement of devices within a venue, wherein the analysis including identifying situations in which a single person is identified as having multiple devices, and situations in which logical groups are identified.

In some embodiments, the method can further comprise including in the analysis identification of device types.

In some embodiments, the determining steps can be each based on a comparison of an analysis of parameters to a threshold.

In yet another aspect, the present disclosure is directed at an apparatus. The apparatus can comprise at least one interface configured to connect to a network, and at least one memory. The apparatus can also comprise at least one processor coupled to the at least one interface. The at least one processor can be configured to detect, via the at least one interface, a plurality of mobile devices in communication with the network. The at least one processor can also maintain, in the at least one memory, information related to the plurality of devices including identification information and movement information of the devices within an area; and determine whether the plurality of devices are associated with a same person based on the movement information of the devices.

In some embodiments, the at least one processor can be configured to determine that a first device and a second device are associated with the same person; determine that the first device is associated with a first device type, and that the second device is associated with a second device type that is different from the first device type; and select whether to transmit information intended for the person to the first device or the second device depending on at least one of the first device type and the second device type.

In some embodiments, the first device type can include a cellphone, and the second device type can include at least one of a tablet and a laptop.

In some embodiments, the movement information can include a direction of movement of a device, a length of time a device is in a location, and a length of time a device is proximate to another device.

In some embodiments, the at least one processor can be further configured to provide as an output an analysis of the movement of devices within the area, wherein the analysis includes identifying situations in which a single person is identified as having multiple devices.

In some embodiments, the at least one processor can be further configured to include in the analysis identification of device types.

In some embodiments, the at least one processor can be configured to determine whether the plurality of devices are associated with the same person based on the movement information of the devices by comparing an analysis of parameters to a threshold.

At this point, it should be noted that the location services system, methods and apparatuses, in accordance with the present disclosure as described above, may involve the processing of input data and the generation of output data to some extent. This input data processing and output data generation may be implemented in hardware or software. For example, specific electronic components may be employed in a wireless LAN controller, wireless access point, mobility services engine, management station, NTP server, or similar or related circuitry for implementing the functions associated with the wireless location services and group identification services in accordance with the present disclosure as described above. Alternatively, one or more processors operating in accordance with instructions may implement the functions associated with the wireless location services and group identification services in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method to provide location services for multiple devices, the computer-implemented method comprising:
    determining that a plurality of devices, identified as communicating with a wireless network, are associated with individuals that form at least a first logical group, wherein the determining is based on movement information of the devices within an area, each device comprising mobile device, wherein a plurality of confidence scores associated with a first device of the plurality of devices are stored and periodically updated, wherein each of the plurality of confidence scores is associated with a respective logical group and indicates a likelihood that a user of the first device is a part of the respective logical group;
    updating the plurality of confidence scores associated with the first device in response to an update of a position of the first device and by operation of one or more computer processors, including: (i) increasing a first confidence score of the plurality of confidence scores upon determining that the position of the first device is within a threshold distance of a location of the first logical group and that the first device is moving in a same direction as the first logical group and (ii) implementing a decay function to increase a measure of influence of more recent movement information on the confidence scores associated with the first device, relative to less recent movement information; and
    generating an output based on the increased first confidence score, wherein the output is transmitted to at least a one of the plurality of devices.

2. The computer-implemented method of claim 1, further comprising:
    determining that the first device is associated with a first device type, and that a second device of the plurality of devices is associated with a second device type that is different from the first device type; and
    selecting whether to transmit information intended for a person to the first device or the second device depending on at least one of the first device type and the second device type.

3. The computer-implemented method of claim 2, wherein the first device type is a cellphone, and the second device type is a tablet or a laptop.

4. The computer-implemented method of claim 1, wherein the movement information includes a direction of movement of a device, a length of time a device is in a location, and a length of time a device is proximate to another device.

5. The computer-implemented method of claim 1, further comprising providing as an output an analysis of the movement of devices within the area, the analysis including identifying situations in which a single person is identified as having multiple devices.

6. The computer-implemented method of claim 5, further comprising including in the analysis identification of device types.

7. The computer-implemented method of claim 1, wherein the determining is based on a comparison of an analysis of parameters to a threshold.

8. The computer-implemented method of claim 1, wherein the computer-implemented method is performed by an analytics engine configured to:
    identify the plurality of devices;
    maintain information relating to the plurality of devices including identification information and the movement information of the devices within the area;
    provide wireless location services to the plurality of devices;
    aggregate data at every predefined time interval of a first length in order to determine location information of the plurality of devices; and
    update a location database based on the location information;
    wherein the computer-implemented method further comprises:
    determining the location of the first logical group;
    determining the direction of movement of the first logical group; and
    determining that the first device of the plurality of devices is associated with a first device type, and that a second device of the plurality of devices is associated with a second device type that is different from the first device type; and
    selecting whether to transmit information intended for a person to the first device or the second device depending on at least one of the first device type and the second device type.

9. The computer-implemented method of claim 8, wherein the first device type is a cellphone, and the second device type is a tablet or a laptop, wherein the movement information includes: (i) a direction of movement of a device; (ii) a length of time a device is in a location; and (iii) a length of time a device is proximate to another device; wherein that the plurality of devices is associated with the individuals that form at least the first logical group, is determined based on a comparison of an analysis of parameters to a threshold, wherein the computer-implemented method further comprises:

providing as an output an analysis of the movement of devices within the area, the analysis including identifying situations in which a single person is identified as having multiple devices and further including identification of device types;

determining that two of the plurality of devices are associated with the same person based on a length of time that a device of the plurality of devices is proximate to another device of the plurality of devices; and determining that two of the plurality of devices are associated with the same person based on a confidence score determined based at least in part on a comparison of a speed of the first device of the plurality of devices to a speed of one or more other devices of the plurality of devices.

10. The computer-implemented method of claim 9, further comprising:

determining that the two of the plurality of devices are associated with the same person when the confidence score is greater than a predetermined threshold; and determining to count foot traffic detected from the movement information only once for a particular area based on the determination that the plurality of devices are associated with the same person;

wherein the analytics engine is operatively connected to a wireless local area network (LAN) controller, a management station, and a network administrator station, wherein the wireless LAN controller is operatively connected to a plurality of wireless access points, wherein the plurality of wireless access points is operatively connected to a network time protocol (NTP) server.

11. The computer-implemented method of claim 10, wherein the wireless LAN controller is configured to automate wireless configuration and management functions, provide visibility and control of the wireless LAN, aggregate received signal strength indicator (RSSI) information for each device, and forward messages to the analytics engine based on a predefined protocol and at every predefined time interval of a second length less than the first length, the predefined protocol comprising network mobility services protocol (NMSP);

wherein the plurality of access points is configured to provide network connectivity between the plurality of devices and the wireless network, wherein the area comprises a venue, wherein the management station imports and synchronizes a floor map for the venue and monitors and configures the wireless LAN controller, wherein the network administration station synchronizes the analytics engine with the wireless LAN controller through the management station, wherein the NTP server synchronizes the one or more wireless access points such that multiple wireless security modules can simultaneously scan the same wireless channel.

12. The computer-implemented method of claim 11, wherein the analytics engine is further configured to:

provide context-based location services to the plurality of devices as the plurality of devices enter and exit a plurality of points of interest at the venue; and aggregate the location information in order to determine a plurality of device parameters including dwell time, crowding, and path choice, in order to permit a visualization of mobile analytics to be generated, the visualization including a dynamically updated map of the venue and in which differently colored icons represent most recent locations of the plurality of devices;

wherein that the plurality of devices are associated with individuals that form at least the first logical group is determined based further on a predefined measure of tolerance comprising an allowable deviation from a group average profile of the first logical group.

13. The computer-implemented method of claim 12, wherein the management station interfaces with the analytics engine using simple object access protocol (SOAP)/extensible markup language (XML) and representational state transfer (REST) messages over hypertext transfer protocol secure (HTTPS);

wherein the network administrator station interfaces with the management station using HTTPS, wherein the network administrator station interfaces with the analytics engine using HTTPS;

wherein the management station interfaces with the wireless LAN controller using simple network management protocol (SNMP);

wherein the analytics engine comprises a plurality of components including a location analytics engine and a mobile group analyzer, wherein the location analytics engine is configured to determine the movement information of the devices within the area, wherein the mobile group analyzer is configured to determine that the plurality of devices are associated with individuals that form at least the first logical group.

14. An apparatus to provide location services for multiple devices, the apparatus comprising:

at least one interface;

at least one computer processor coupled to the at least one interface; and at least one memory containing a program executable by the at least one computer processor to:

determine that a plurality of devices, identified as communicating with a wireless network, are associated with individuals that form a logical group, based on movement information of the devices within an area, each device comprising a mobile device, wherein the at least one processor stores and periodically updates a plurality of confidence scores associated with a first device of the plurality of devices, wherein each of the plurality of confidence scores is associated with a respective logical group and indicates a likelihood that a user of the first device is a part of the respective logical group;

update the plurality of confidence scores associated with the first device in response to an update of a position of the first device, including: (i) increasing a first confidence score of the plurality of confidence scores upon determining that the position of the first device is within a threshold distance of a location of the first logical group and that the first device is moving in a same direction as the first logical group and (ii) implementing a decay function to increase a measure of influence of more recent movement information on the confidence scores associated with the first device, relative to less recent movement information; and generate an output based on the increased first confidence score, wherein the output is transmitted to at least a one of the plurality of devices.

15. The apparatus of claim 14, wherein the at least one processor is configured to:

determine that the first device and a second device are associated with the same person;

determine that the first device is associated with a first device type, and that the second device is associated with a second device type that is different from the first device type; and select whether to transmit information intended for the person to the first device or the second device depending on at least one of the first device type and the second device type.

16. The apparatus of claim 15, wherein the first device type is a cellphone, and the second device type is a tablet or a laptop.

17. The apparatus of claim 14, wherein the movement information includes a direction of movement of a device, a length of time a device is in a location, and a length of time a device is proximate to another device.

18. The apparatus of claim 14, wherein the at least one processor is further configured to provide as an output an analysis of the movement of devices within the area, wherein the analysis includes identifying situations in which a single person is identified as having multiple devices.

19. The apparatus of claim 18, wherein the at least one processor is further configured to include in the analysis identification of device types.

20. The apparatus of claim 14, wherein the at least one processor is configured to determine whether two of the plurality of devices are associated with the same person based on the movement information of the devices by comparing an analysis of parameters to a threshold.

21. One or more non-transitory computer-readable media comprising logic that when executed performs operations to provide location services for multiple devices, the operations comprising:

determining that a plurality of devices, identified as communicating with a wireless network, are associated with individuals that form a logical group, wherein the determining is based on movement information of the devices within an area, each device comprising a mobile device, wherein a plurality of confidence scores associated with a first device of the plurality of devices are stored and periodically updated, wherein each of the plurality of confidence scores is associated with a respective logical group and indicates a likelihood that a user of the first device is a part of the respective logical group;

updating the plurality of confidence scores associated with the first device in response to an update of a position of the first device and by operation of one or more computer processors when executing the logic, including: (i) increasing a first confidence score of the plurality of confidence scores upon determining that the position of the first device is within a threshold distance of a location of the first logical group and that the first device is moving in a same direction as the first logical group and (ii) implementing a decay function to increase a measure of influence of more recent movement information on the confidence scores associated with the first device, relative to less recent movement information; and generating an output based on the increased first confidence score, wherein the output is transmitted to at least a one of the plurality of devices.

22. The one or more non-transitory computer-readable media of claim 21, wherein the determining includes determining that the first device and a second device are associated with individuals from the logical group, but are not carried by one person.

23. The one or more non-transitory computer-readable media of claim 21, wherein the movement information includes the direction of movement of a device, the length of time a device is in a location, and the length of time a device is proximate to another device.

24. The one or more non-transitory computer-readable media of claim 21, the operations further comprising providing as an output an analysis of movement of devices within a venue, the analysis including identifying situations in which a single person is identified as having multiple devices, and situations in which logical groups are identified.

* * * * *